(12) United States Patent
Miller et al.

(10) Patent No.: US 8,974,594 B2
(45) Date of Patent: Mar. 10, 2015

(54) MICROCAPSULE CORROSION CONTROL IN REINFORCED CONCRETE

(75) Inventors: Seth Miller, Englewood, CO (US); Thomas A. Yager, Encinitas, CA (US)

(73) Assignee: Empire Technology Development LLC, Wilmington, DE (US)

( * ) Notice: Subject to any disclaimer, the term of this patent is extended or adjusted under 35 U.S.C. 154(b) by 697 days.

(21) Appl. No.: 13/139,583

(22) PCT Filed: Mar. 29, 2011

(86) PCT No.: PCT/US2011/030236
§ 371 (c)(1),
(2), (4) Date: Jun. 14, 2011

(87) PCT Pub. No.: WO2012/134441
PCT Pub. Date: Oct. 4, 2012

(65) Prior Publication Data
US 2012/0252934 A1    Oct. 4, 2012

(51) Int. Cl.
*C04B 16/08*    (2006.01)
*C04B 40/06*    (2006.01)
*C04B 28/02*    (2006.01)
*C04B 20/10*    (2006.01)
*B01J 13/04*    (2006.01)
(Continued)

(52) U.S. Cl.
CPC ............. *C04B 40/0633* (2013.01); *C04B 28/02* (2013.01); *C04B 20/1033* (2013.01); *B01J 13/043* (2013.01); *C04B 2103/0094* (2013.01); *C04B 2111/00112* (2013.01); *C04B 2111/26* (2013.01)
USPC ............ 106/713; 106/724; 206/219; 206/321

(58) Field of Classification Search
CPC .. C04B 40/0641; C04B 16/08; C04B 20/002; C04B 20/0036; C04B 22/08

USPC ........................... 106/713, 724; 206/219, 321
See application file for complete search history.

(56) References Cited

U.S. PATENT DOCUMENTS 3,627,693 A  * 12/1971 Scarpelli ................. 428/402.22
3,691,090 A      9/1972 Kitijima et al.
(Continued)

FOREIGN PATENT DOCUMENTS

WO       WO 03/089382 A1    10/2003

OTHER PUBLICATIONS

Kashi, et al., Responsive Microcapsules for Corrosion Inhibition, DOD Corrosion Conference (2009), https://www.corrdefense.org/Technical%20Papers/Responsive%20MICROCAPSULES%20FOR%20CORROSION%20INHIBITION.PDF—date retrieved Jun. 7, 2011.
(Continued)

*Primary Examiner* — Paul Marcantoni
(74) *Attorney, Agent, or Firm* — Turk IP Law, LLC (57) ABSTRACT

Corrosion control in reinforced concrete is generally disclosed. Some example embodiments may include concrete including aggregate, cement, and/or microcapsules distributed within the cement, where the individual microcapsules may include a high pH salt substantially contained within an acid-soluble shell. If the pH of the concrete decreases, the acid soluble shell may swell and/or dissolve, such as below a pH of about 11, which may release the high pH salt. The high pH salt may locally increase the pH of the concrete. By increasing the pH above about pH 11, corrosion of steel rebar may be prevented and/or reduced.

12 Claims, 7 Drawing Sheets

(51) Int. Cl.
*C04B 103/00* (2006.01)
*C04B 111/00* (2006.01)
*C04B 111/26* (2006.01)

(56) References Cited

U.S. PATENT DOCUMENTS

| | | | | |
|---|---|---|---|---|
| 3,873,332 | A * | 3/1975 | McCreight | 106/660 |
| 3,896,082 | A | 7/1975 | Rensmann et al. | |
| 4,096,944 | A * | 6/1978 | Simpson | 206/219 |
| 4,109,072 | A | 8/1978 | Panzer et al. | |
| 4,259,315 | A * | 3/1981 | Lippmann et al. | 424/459 |
| 4,487,529 | A * | 12/1984 | Douty | 405/259.6 |
| 4,832,955 | A * | 5/1989 | Snipes et al. | 424/456 |
| 4,870,148 | A * | 9/1989 | Belz et al. | 526/318.41 |
| 4,961,790 | A * | 10/1990 | Smith et al. | 106/823 |
| 5,203,629 | A * | 4/1993 | Valle et al. | 366/2 |
| 5,224,595 | A * | 7/1993 | Sugimoto et al. | 206/321 |
| 5,224,774 | A * | 7/1993 | Valle et al. | 366/2 |
| 5,433,953 | A * | 7/1995 | Tsuei et al. | 424/489 |
| 6,080,334 | A | 6/2000 | Heimann et al. | |
| 6,306,210 | B1 * | 10/2001 | Miksic et al. | 106/810 |
| 6,308,162 | B1 | 10/2001 | Ouimet et al. | |
| 6,348,093 | B1 * | 2/2002 | Rieder et al. | 106/724 |
| 6,350,304 | B1 | 2/2002 | Tozaka | |
| 6,399,021 | B1 | 6/2002 | Heimann et al. | |
| 6,527,849 | B2 | 3/2003 | Dry | |
| 7,378,479 | B2 * | 5/2008 | Tamareselvy et al. | 526/333 |
| 7,541,089 | B1 | 6/2009 | Miksic et al. | |
| 7,662,408 | B2 * | 2/2010 | Saito et al. | 424/468 |
| 2003/0008156 | A1 * | 1/2003 | Pocius et al. | 428/457 |
| 2005/0019388 | A1 * | 1/2005 | Furuta et al. | 424/452 |
| 2005/0172862 | A1 * | 8/2005 | Rich | 106/638 |
| 2005/0274292 | A1 * | 12/2005 | Rich | 106/696 |
| 2007/0196463 | A1 * | 8/2007 | Podili et al. | 424/456 |
| 2008/0047472 | A1 | 2/2008 | Dry | |
| 2008/0050407 | A1 | 2/2008 | Haas | |
| 2008/0057115 | A1 * | 3/2008 | Okamoto et al. | 424/452 |
| 2009/0291309 | A1 * | 11/2009 | Salaun et al. | 428/402.2 |
| 2012/0156288 | A1 * | 6/2012 | Lakkis et al. | 424/455 |

OTHER PUBLICATIONS

International Search Report with Written Opinion issued Jun. 7, 2011 in PCT/US2011/030236 which was filed on Mar. 29, 2011.
Pebere, et al., Corrosion inhibition study of a carbon steel in acidic media containing hydrogen sulphide and organic surfactants, Journal of Applied Electrochemistry, 1988, pp. 225-231, 18(2), Chapman and Hall Ltd.
Watano, et al., Fine particle coating by a novel rotating fluidized bed coater, Powder Technology, 2004, pp. 172-176, 141, Elsevier, The Netherlands.
Tyagi, et al, Imidazoline and Its Derivatives: An Overview, Journal of Oleo Science, 2007, pp. 211-222, vol. 56, No. 5, Japan Oil Chemists' Society.
MCI-2022 Sealer Patented, Migratory Corrosion Inhibitor (MCI) Products for Concrete, CORTEC Corporation web page, http://www.em.is/kerfi/verslun/files/products/MCI%202022%20-%20Data.pdf? PHPSESSID=4ac31aa72882ac7f108d963905—date retrieved Feb. 7, 2011.
De Oliveira,E et al., Study on compressed stress, water absorption and modulus of elasticity of produced concrete made by recycled aggregate, http://congress.cimne.upc.es/rilem04/admin/Files/FilePaper/p312.pdf—date retrieved Feb. 9, 2011.
http://en.wikipedia.org/wiki/Imidazoline—date retrieved Feb. 9, 2011.
http://en.wikipedia.org/wiki/Micro-encapsulation—date retrieved Feb. 9, 2011.
http://en.wikipedia.org/wiki/Concrete—date retrieved Mar. 23, 2011.
http://en.wikipedia.org/wiki/Reinforced concrete—date retrieved Mar. 23, 2011.
Fluid Bed Systems: A Review, http://www.pharmainfo.net/freebooks/fluidized-bed-systems-review—date retrieved Mar. 23, 2011.
Fluid Bed Coating, http://www.cjtech.co.kr/Technical%20Process%20Fluid%20Bed%20Coating.htm—date retrieved Mar. 23, 2011.
International Preliminary Report on Patentability PCT/US2011/030236 mailed Oct. 1, 2013.
PCT/US2011/030236 International Preliminary Report on Patentability, issued Oct. 1, 2013.

* cited by examiner

MICROCAPSULE CORROSION CONTROL IN REINFORCED CONCRETE

CROSS-REFERENCE TO RELATED APPLICATIONS

This application is a national stage entry of PCT/US2011/030236, filed Mar. 29, 2011, which is hereby incorporated by reference. BACKGROUND The present disclosure generally pertains to control of corrosion in reinforced concrete and, more particularly, to microcapsule corrosion control in reinforced concrete.

SUMMARY

Control of corrosion in reinforced concrete is generally disclosed. Some example embodiments may include methods, apparatus, and/or systems pertaining to corrosion control in reinforced concrete. For example, some described methods, apparatus, and/or systems may include microcapsule corrosion control in reinforced concrete.

Some example concrete structures according to at least some aspects of the present disclosure may include aggregate, cement interposing and bonding the aggregate, and/or microcapsules distributed within the cement. The individual microcapsules may include a high pH salt substantially contained within an acid-soluble shell.

Some example additives for concrete according to at least some aspects of the present disclosure may include microcapsules. The individual microcapsules may include an acid-soluble shell substantially enclosing a core comprising a pH adjustment material.

Some example methods of preparing concrete according to at least some aspects of the present disclosure may include combining cement, aggregate, and microcapsules. The individual microcapsules may include a shell substantially enclosing a core comprising a high pH salt. The shell may be substantially insoluble in water above about pH 12 and at least partially soluble in water below about pH 11.

Some example cement mixtures according to at least some aspects of the present disclosure may include microcapsules dispersed in hydraulic cement. The individual microcapsules may include a shell substantially enclosing a core comprising a high pH salt. The shell may be substantially insoluble in water above about pH 12 and at least partially soluble in water below about pH 11.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Methods, systems, devices, and/or apparatus related to corrosion control in reinforced concrete are described. Some example embodiments according to the present disclosure may pertain to microcapsule corrosion control in reinforced concrete.

The present disclosure contemplates that concrete may be composite construction material comprising cement (e.g., Portland cement) and/or other cementitious materials (e.g., fly ash and slag cement), aggregate (e.g., coarse aggregate made of gravels and/or crushed rocks such as limestone, or granite, and/or fine aggregate such as sand), water, and/or chemical admixtures. Reinforced concrete may be concrete in which reinforcement bars ("rebars"), reinforcement grids, plates, or fibers have been incorporated to strengthen the concrete in tension. For example, reinforced concrete may comprise concrete with steel rebars embedded therein. Example structures comprising concrete and/or reinforced concrete may include sea walls, retaining walls, dams, flood control channels, tanks, roads, tunnels, buildings, bridges, pilings, foundations, piers, docks, ships, barges, reverse osmosis plants, desalination plants, and/or a chemical plants.

The present disclosure contemplates that, shortly after mixing, cement may have a pH of about 13 to about 14. Over time, the pH of cement may decrease due to the process of carbonation. When its pH falls below about 11, corrosion of steel (e.g., steel reinforcing bar or other steel structures embedded in the concrete) may occur. Corrosion may be accelerated by the presence of the chloride ions, oxygen, and/or water. Although such corrosion may present a significant problem for substantially all reinforced concrete structures, it may be a particularly troublesome problem for cements mixed with sea water, cements immersed in sea water, and/or cements exposed to salting for ice control.

Some example embodiments according to at least some aspects of the present disclosure may comprise particles of a high pH salt microencapsulated in a shell formed of an acid soluble polymer, such as a poly(imidazoline). The microcapsules may be distributed throughout a reinforced concrete structure. As the pH of the concrete decreases due to carbonation, the acid soluble polymer may swell and/or dissolve, such as below a pH of about 11, which may release the high pH salt. The high pH salt may locally increase the pH of the concrete. By increasing the pH above about 11, corrosion of steel rebar may be prevented and/or reduced.

Figure 1:
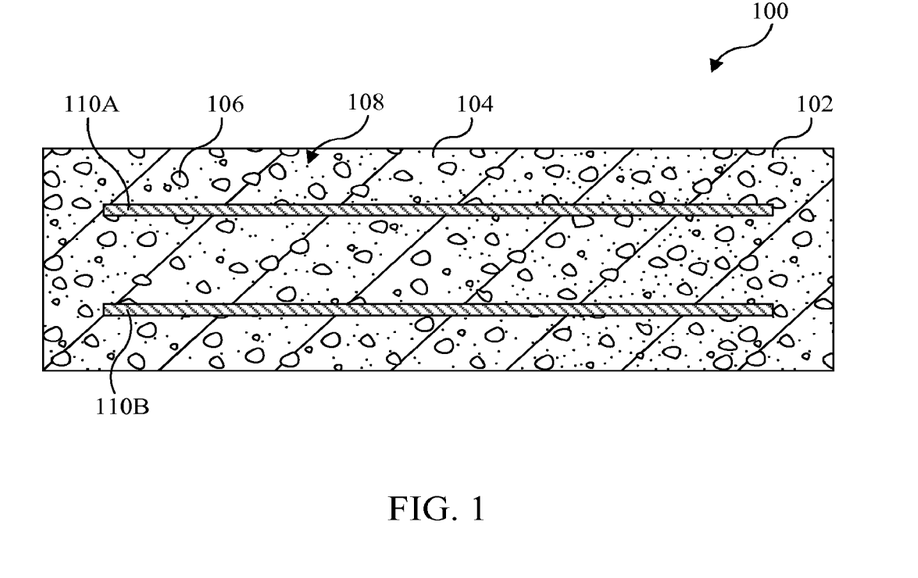
FIG. 1 is a cross-sectional view of an example reinforced concrete structure.

FIG. 1 is a cross-sectional view of an example reinforced concrete structure 100, in accordance with at least some embodiments of the present disclosure. Structure 100 may comprise concrete 102, which may comprise cement 104 and/or aggregate 106. Cement 104 may interpose and/or bond aggregate 106. A plurality of microcapsules 108 comprising a pH adjustment material may be distributed within cement 104. Some example embodiments may include one or more rebars 110A, 110B embedded in concrete 102. Rebars 110A, 110B may be constructed of steel, for example.

In some example embodiments according to at least some aspects of the present disclosure, microcapsules 108 may comprise about 0.1% to about 10% of cement 104 by volume. In some example embodiments, microcapsules 108 may comprise about 1% to about 5% of cement 104 by volume.

As described below with reference to FIG. 2, some example individual microcapsules 108 may comprise a high pH salt substantially contained within an acid-soluble shell. In some example embodiments, a ratio by weight of the high pH salt to cement 104 may be about 0.0001:1 to about 0.0010:1. In some example embodiments, the ratio by weight of the high pH salt to cement 104 may be about 0.0005:1.

Figure 2:
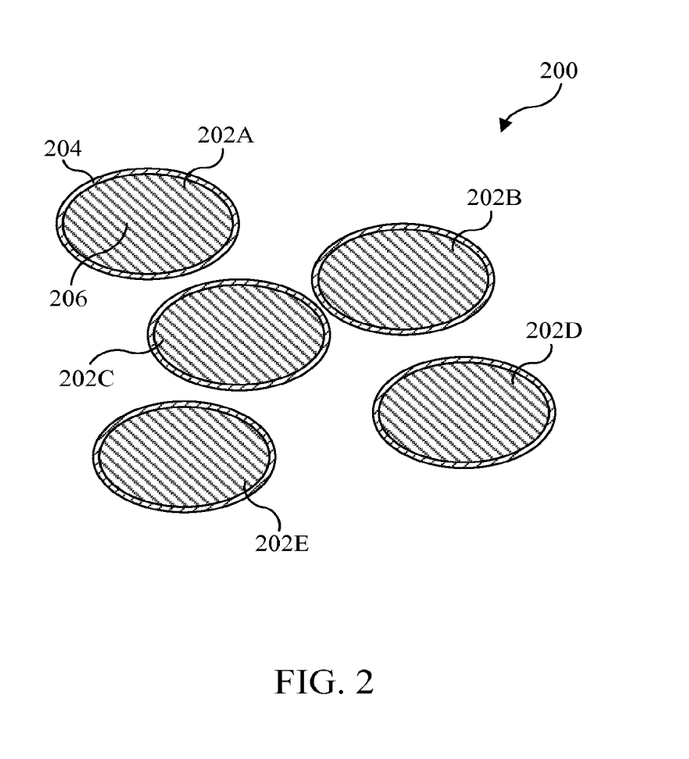
FIG. 2 is a cross-sectional view of an example additive for concrete.

FIG. 2 is a cross-sectional view of an example additive 200 for concrete, in accordance with at least some embodiments of the present disclosure. Additive 200 may comprise a plurality of microcapsules 202A, 202B, 202C, 202D, 202E. An individual microcapsule 202A may include a shell 204 substantially enclosing a core 206.

In some example embodiments according to at least some aspects of the present disclosure, shell 204 may comprise an acid-soluble polymer. For example, shell 204 may comprise a polymer comprising imidazoline subunits (e.g., poly(imidazoline)). In some example embodiments, shell 204 may be substantially insoluble in water above about pH 12 and may be at least partially soluble in water below about pH 11. As used herein, partial solubility may include swelling without fully dissolving. For example, a shell 204 that is described as being at least partially soluble in water below about pH 11 may comprise one or more portions that swell and/or fully dissolve in water below about pH 11.

Figure 3:
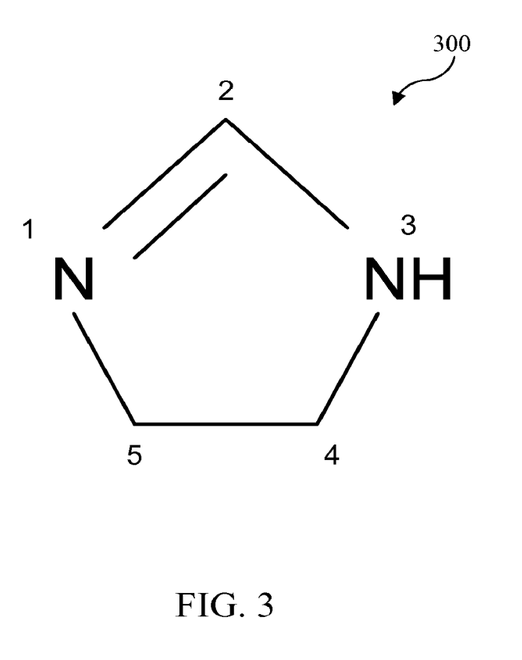
FIG. 3 is a structural diagram of the structural unit of neutral imidazoline.

The present disclosure contemplates that the imidazoline monomer unit may have a pKa of about 10.8 and/or may exist in a protonated (cationic), substantially water-soluble form below a pH of about 11. Above about pH 11, poly(imidazoline) may exist as a neutral compound and/or may be substantially water-insoluble. The structural unit 300 of neutral imidazoline is illustrated in FIG. 3. Addition of acid may result in protonation at the 1 position. It may be derivitized at the 2 position to convert it to a polymerizable monomer.

Figure 4:
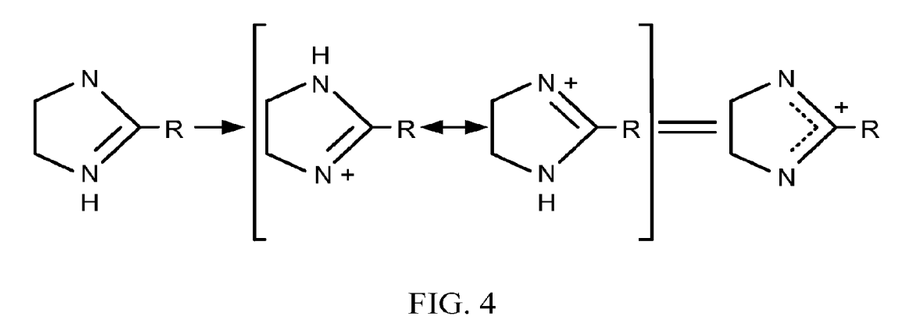
FIG. 4 is a graphical representation illustrating protonation of imidazoline.

FIG. 4 is a graphical representation illustrating protonation of imidazoline. On protonation, cationic imidazoliniums (quaterized imidazolines) may form, where the cation may be delocalized between the two nitrogens.

Figure 5:
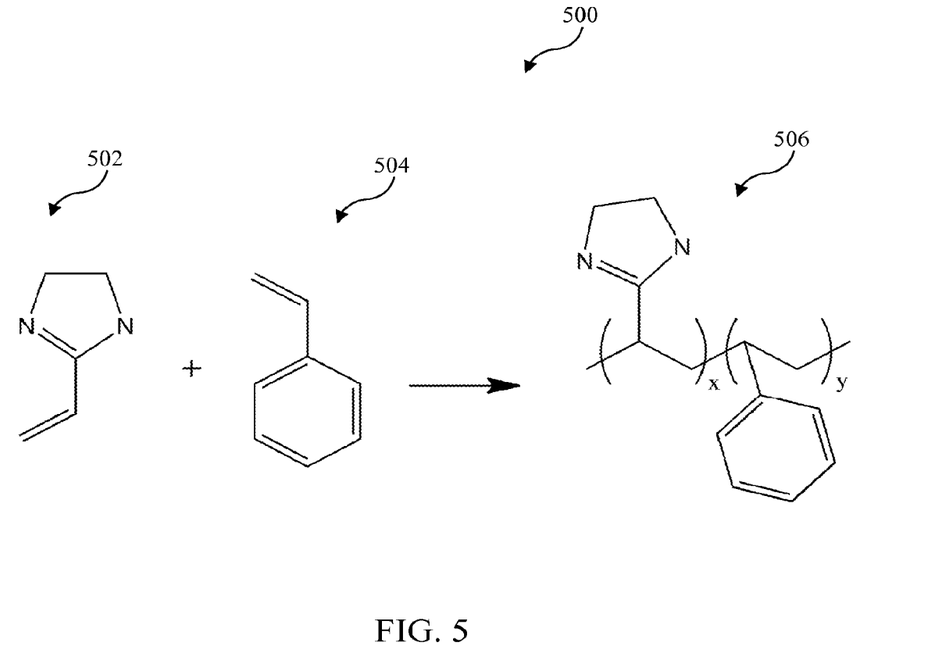
FIG. 5 is a graphical representation illustrating a reaction between vinylimidazoline and styrene.

The present disclosure contemplates that reactive imidazoline monomers may be synthesized and that they may be incorporated into polymers. FIG. 5 is a graphical representation illustrating an example reaction between vinylimidazoline and styrene. As illustrated in FIG. 5, 2-vinyl-imidazoline 502 may be synthesized and copolymerized with styrene 504. The resulting copolymer 506 may be substantially water-insoluble when the imidazolines are neutral or basic, but, on addition of acid, the imidazolines may protonate to form a polycationic, substantially water soluble species. The solubility of the polymer may be tuned by varying the styrene/vinylimidazoline ratio. In some example embodiments, a polymer comprising imidazoline subunits may comprise about 20% to about 30% imidazoline and/or about 70% to about 80% styrene.

Other comonomers which may be copolymerized with imidazoline may include the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetrachlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and .alpha.-substituted ringsubstituted styrenes, e.g., .alpha.-methyl styrene, .alpha.-methyl-paramethyl styrene, etc.; unsaturated ethers, e.g., ethyl vinyl ether, diallyl ether, ethyl methallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; and/or unsaturated polyhydric alcohol (e.g., butenediol, etc.) esters of saturated and unsaturated, aliphatic and aromatic, monobasic and polybasic acids.

Returning to FIG. 2, in some example embodiments according to at least some aspects of the present disclosure, core 206 may comprise a pH adjustment material, such as a high pH salt. Some example high pH salts may comprise one or more of a phosphate and a carbonate. For example, the some high pH salts may comprise sodium carbonate.

In some example embodiments according to at least some aspects of the present disclosure, core 206 may be encapsulated within shell 204 using methods such as, without limitation, pan coating, air-suspension coating, spray drying, spray chilling, fluid-bed coating, extrusion, coextrusion, inclusion, granulation, roll compaction, and/or coacervation. These processes may be used individually or in combination. For example, a first process may provide a partial coating, and a second process may provide substantially full encapsulation of core 206. In generally, any one or more techniques which provide substantially complete encapsulation of core 206 within shell 204 may be used.

In some example embodiments according to at least some aspects of the present disclosure, microcapsule 202A may be about 10 μm to about 500 μm in size. In some example embodiments, microcapsule 202A may be about 100 μm to about 250 μm in size.

In some example embodiments according to at least some aspects of the present disclosure, microcapsules 202A, 202B, 202C, 202D, 202E may be included in a cement mixture. An example cement mixture may comprise a hydraulic cement and a plurality of microcapsules 202A, 202B, 202C, 202D, 202E dispersed in the hydraulic cement. As described above, individual microcapsule 202A may comprise shell 204 substantially enclosing core 206 comprising a high pH salt. Shell 204 may be substantially insoluble in water above about pH 12 and/or at least partially soluble in water below about pH 11. In some example embodiments, the high pH salt may comprise one or more of a phosphate and a carbonate and/or shell 204 may comprise an acid-soluble polymer.

Figure 6:
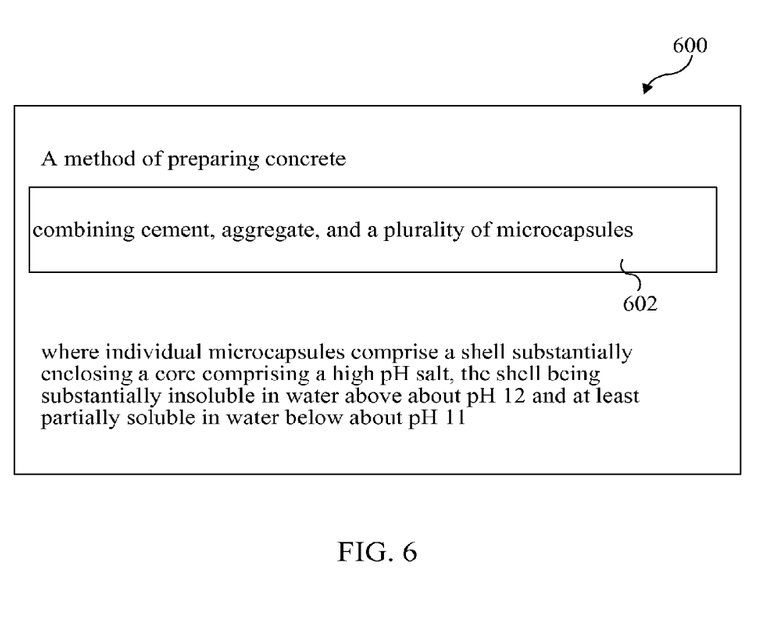
FIG. 6 is a flow chart illustrating an example method of preparing concrete.

FIG. 6 is a flow chart illustrating an example method 600 of preparing concrete, in accordance with at least some embodiments of the present disclosure. Method 600 may include an operation 602, which may include combining cement, aggregate, and a plurality of microcapsules. The individual microcapsules may include a shell substantially enclosing a core comprising a high pH salt. The shell may be substantially insoluble in water above about pH 12 and at least partially soluble in water below about pH 11.

Some example methods according to at least some embodiments of the present disclosure may include combining the cement, aggregate, and microcapsules such that the microcapsules comprise about 1% to about 5% of the total volume of the cement, aggregate, and the microcapsules. Some example methods may include combining the cement, aggregate, and the plurality of microcapsules such that a ratio by weight of the high pH salt to the cement is about 0.0001:1 to about 0.0020:1. Some example methods may include combining the cement, aggregate, and the plurality of microcapsules such that a ratio by weight of the high pH salt to the cement is about 0.0001:1. Some example methods may include combining the cement, aggregate, and the plurality of microcapsules such that a ratio by weight of the high pH salt to the cement is about 0.0005:1. Some example methods may include combining the cement, aggregate, and the plurality of microcapsules such that a ratio by weight of the high pH salt to the cement is about 0.0010:1.

Figure 7:
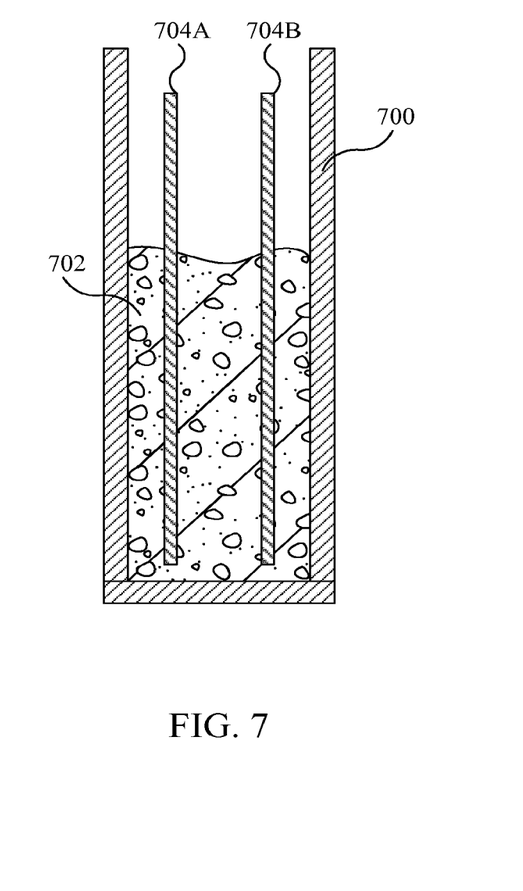
FIG. 7 is a cross-sectional view of a form containing an example pourable mixture; all arranged in accordance with at least some embodiments of the present disclosure.

Some example methods according to at least some embodiments of the present disclosure may comprise combining cement, aggregate, and a plurality of microcapsules with water to form a pourable mixture. As illustrated in FIG. 7, a cross-sectional view of a form 700 containing an example pourable mixture 702, the pourable mixture 702 may be placed into form 700 and allowed to at least partially cure. In some example methods, one or more steel rebars 704A, 704B or other reinforcing components may be embedded in the pourable mixture 402, such as by mounting the rebars 704A, 704B within the form 700 prior to placing the pourable mixture 702 in the form 700.

In some example embodiments according to the present disclosure, the pH adjustment material (e.g., high pH salts) may remain substantially contained within the microcapsules until the pH of the surrounding concrete falls below about pH 11. Thus, the pH adjustment material may remain substantially undepleted until the pH of the surrounding concrete falls below about pH 11. Further, because the pH of freshly mixed concrete may be above about pH 11, the pH adjustment material may not interfere with the cement curing process.

Some example embodiments according to at least some aspects of the present disclosure may be compatible with other methods of corrosion protection in reinforced concrete. For example, the use of microcapsules containing pH adjustment material may be suitable for use in conjunction with phosphate conversion coatings, galvanic coatings, polymer coatings, and the like, which may be applied to steel rebars.

EXAMPLES

Example 1

Preparation of Microcapsules Using Air-Suspension and/or Fluid-Bed Coating

In some example embodiments according to the present disclosure, microcapsules 202A, 202B, 202C, 202D, 202E may be prepared using air-suspension coating and/or fluid-bed coating. For example, particles (e.g., core 206) may be coated while suspended in an upward-moving air stream. The particles may be supported by a perforated plate having different patterns of holes inside and outside a cylindrical insert. Just sufficient air may be permitted to rise through the outer annular space to fluidize the settling particles. The air-supported particles may then be spray-coated with a polymer dissolved in a solvent (such as tetrahydrofuran) giving a substantially uniform coating (e.g., shell 204). The air stream may evaporate and/or carry away the solvent, leaving a substantially fully encapsulated particle (e.g., core 206). When completed, some example microcapsules 202A, 202B, 202C, 202D, 202E may include about 10% to about 90% by weight polymer (e.g., shell 204) and about 90% to about 10% by weight particle (e.g., core 206). During the process, microcapsules 202A, 202B, 202C, 202D, 202E may agglomerate to form larger particles as they settle and dry. This may be particularly useful when a small size core 206 is used (e.g., about 1 μm). Larger sizes (e.g., about 100 μm) may have less agglomeration. In some example embodiments, agglomerates may be milled to reduce their size. In some example embodiments, agglomerates may be milled to approximately correspond to the cement particle size (e.g., about 1 μm to about 100 μm), which may reduce settling in the dry cement powder mix.

Example 2

Preparation of Cement

In some example embodiments according to the present disclosure, microcapsules 202A, 202B, 202C, 202D, 202E may be mixed with dry cement ingredients prior to the introduction of water. This may be accomplished, for example, using a standard mixing station that may include one or more ball mills and/or "V" mixers. In some example embodiments, standard cement compositions may be used, and microcapsules 202A, 202B, 202C, 202D, 202E may be added at about 0.0005:1 weight fraction.

Example 2

Preparation of Cement for a Benign Corrosion Environment

In some example embodiments according to the present disclosure, microcapsules 202A, 202B, 202C, 202D, 202E may be mixed with dry cement ingredients prior to the introduction of water. This may be accomplished, for example, using a standard mixing station that may include one or more ball mills and/or "V" mixers. In some example embodiments, standard cement compositions may be used, and microcapsules 202A, 202B, 202C, 202D, 202E may be added at about 0.0001:1 weight fraction. Because such a mixture may provide less pH adjustment material than a mixture having a higher weight fraction of microcapsules 202A, 202B, 202C, 202D, 202E, it may be used for cement that is expected to be subjected to relatively benign corrosion environments.

Example 2

Preparation of Cement for a High Salt Environment

In some example embodiments according to the present disclosure, microcapsules 202A, 202B, 202C, 202D, 202E may be mixed with dry cement ingredients prior to the introduction of water. This may be accomplished, for example, using a standard mixing station that may include one or more ball mills and/or "V" mixers. In some example embodiments, standard cement compositions may be used, and microcapsules 202A, 202B, 202C, 202D, 202E may be added at about 0.0010:1 weight fraction. Because such a mixture may provide more pH adjustment material than a mixture having a lower weight fraction of microcapsules 202A, 202B, 202C, 202D, 202E, it may be used for cement that is expected to be subjected to high salt and/or ocean environments.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A concrete composition comprising:
    an aggregate;
    a cement that is mixed with the aggregate;
    a plurality of microcapsules distributed within the cement, individual microcapsules comprising an acid-soluble shell, wherein the shell includes a polymer comprising imidazoline subunits and is insoluble in water above about pH 12 and is at least partially soluble in water below about pH 11; and
    in response to a decrease of a pH of the concrete composition below about pH 11, the salt is releasable to increase the pH of the concrete composition to above about pH 11 to prevent a corrosion within the concrete composition.

2. The composition of claim 1, wherein the salt comprises one or more of a phosphate, and a carbonate.

3. The composition of claim 1, wherein the salt comprises sodium carbonate.

4. The composition of claim 1, wherein the shell comprises an acid-soluble polymer.

5. The composition of claim 1, wherein the imidazoline subunits have a pKa of about 10.8.

6. The composition of claim 5, wherein the polymer comprising the imidazoline subunits comprises about 20% to about 30% imidazoline and about 70% to about 80% styrene.

7. The composition of claim 1, wherein the microcapsules comprise about 0.1% to about 10% of the cement by volume.

8. The composition of claim 1, wherein the microcapsules comprise about 1% to about 5% of the cement by volume.

9. The composition of claim 1, wherein a ratio by weight of the salt to the cement is about 0.0001: 1 to about 0.0020: 1.

10. The composition of claim 1, wherein a ratio by weight of the salt to the cement is about 0.0001:1.

11. The composition of claim 1, wherein a ratio by weight of the salt to the cement is about 0.0005:1.

12. The composition of claim 1, wherein a ratio by weight of the salt to the cement is about 0.0010:1.

* * * * *

UNITED STATES PATENT AND TRADEMARK OFFICE
CERTIFICATE OF CORRECTION

PATENT NO.         : 8,974,594 B2                                         Page 1 of 1
APPLICATION NO.    : 13/139583
DATED              : March 10, 2015
INVENTOR(S)        : Miller et al.

It is certified that error appears in the above-identified patent and that said Letters Patent is hereby corrected as shown below:

On Title Page 2, Item (56), under "OTHER PUBLICATIONS", in Column 2, Line 10, delete "et al," and insert -- et al., --, therefor.

In the Specification

In Column 1, Line 8, delete "entry" and insert -- entry under 35 U.S.C. § 371 --, therefor.

In Column 1, Line 10, delete "BACKGROUND" and insert the same at Line 11 as a new Heading.

Signed and Sealed this
Fourth Day of August, 2015

Michelle K. Lee
*Director of the United States Patent and Trademark Office*